United States Patent

[11] 3,621,409

[72] Inventor Kazutoshi Segawa
Ibaragi-shi, Japan
[21] Appl. No. 869,498
[22] Filed Oct. 27, 1969
[45] Patented Nov. 16, 1971
[73] Assignee Matsushita Electric Industrial Co., Ltd.
Osaka, Japan

[54] FREQUENCY DISCRIMINATOR CIRCUIT HAVING A NARROW DETECTION BAND
3 Claims, 16 Drawing Figs.

[52] U.S. Cl. .......... 329/110, 307/233, 325/349, 329/129, 329/138, 329/204
[51] Int. Cl. .......... H03d 3/08
[50] Field of Search .......... 329/204, 129, 130, 137, 138, 141–143, 139; 307/232, 233; 325/349

[56] References Cited

UNITED STATES PATENTS

| | | | |
|---|---|---|---|
| 2,904,675 | 9/1959 | Janssen et al. | 329/138 X |
| 3,038,123 | 6/1962 | Crimmins | 329/142 X |
| 3,063,019 | 11/1962 | DeWaard et al. | 329/129 |
| 3,409,838 | 11/1968 | McLeod | 329/129 X |
| 3,462,694 | 8/1969 | Avins | 329/129 X |

FOREIGN PATENTS

| | | | |
|---|---|---|---|
| 1,160,035 | 12/1963 | Germany | 329/129 |

*Primary Examiner*—Alfred L. Brody
*Attorney*—Stevens, Davis, Miller & Mosher

ABSTRACT: A frequency discriminator circuit comprising means for providing a signal of which the phase is varied with the frequency of an input signal, means for generating two signals by the use of vectorial sums of said signal having the phase thereof varied and said input signal, and means for comparing the amplitude of each of said two vectorial signals and that of a reference signal which is proportional to the amplitude of said input signal and detecting that one of said two signals which has a greater amplitude, wherein the demodulation and frequency detection of an FM signal having a small frequency deviation as compared with the center frequency are limited so as to be effected only in the required frequency band, thus preventing noise disturbance outside the required band from occurring in the output.

K. SEGAWA
INVENTOR

BY Stevens, Davis, Miller & Mosher
ATTORNEYS

FIG. 4
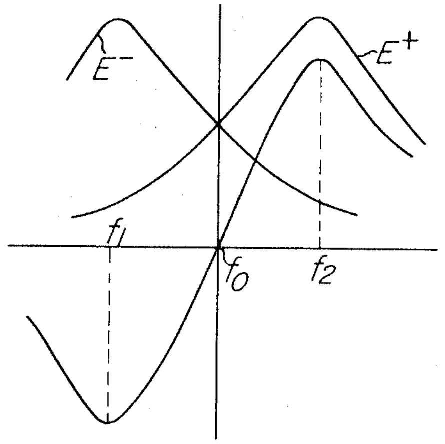
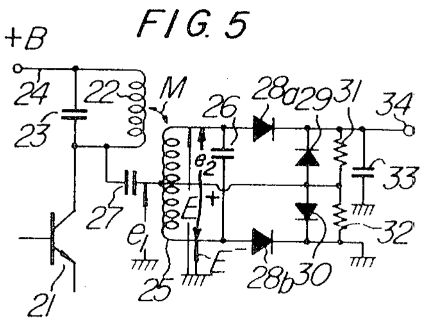
FIG. 8
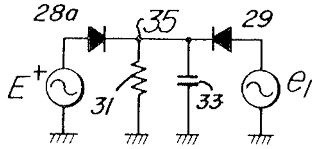
FIG. 6
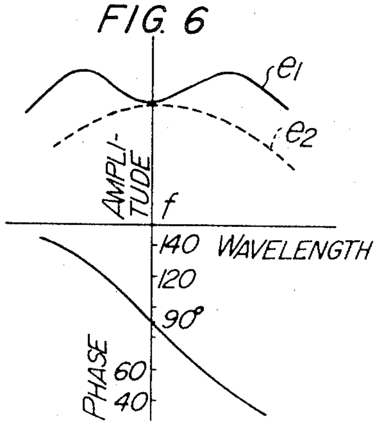
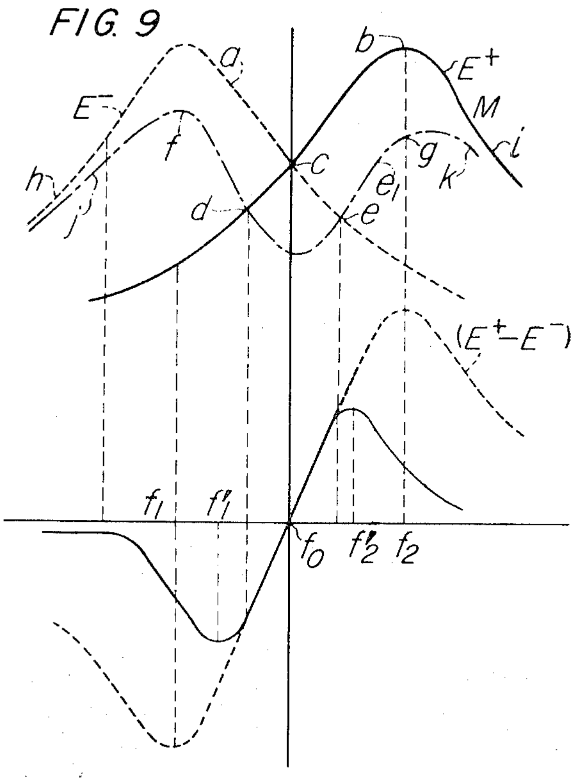
FIG. 7
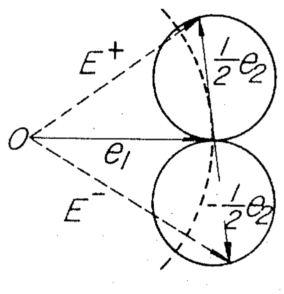

FREQUENCY DISCRIMINATOR CIRCUIT HAVING A NARROW DETECTION BAND

This invention relates to a frequency discriminator circuit.

Among the conventional frequency discriminator circuits are the ratio detector circuit, Foster-Seeley phase discriminator circuit and modified forms of these circuits, which are used as the sound detector circuit of a television receiver. However, the use of such circuits as the automatic local frequency controlling circuit of a television receiver or the circuit for effecting at the IF frequency the sound demodulation of a sound multiplex broadcast which has recently been approved in Japan necessitates an unnecessarily extended frequency band for the frequency detection or FM demodulation. Thus, it is impossible to achieve satisfactory performance.

A primary object of this invention is to provide a frequency discriminator circuit adapted to eliminate any influences of disturbance signal and noise outside the signal frequency band but relatively close to the signal frequency in the demodulation and frequency detection of an FM signal having a small frequency deviation as compared with the center frequency.

Other objects, features and advantages of the present invention will become apparent from the following description taken in conjunction with the accompanying drawings, in which:

FIG. 4 is a view showing the S-characteristic thereof;

FIG. 5 is a circuit diagram showing the frequency-discriminator circuit according to an embodiment of the present invention;

FIG. 6 is a view showing the characteristics of an ordinary double tuning circuit;

FIG. 7 is a vector view showing the vector sum signal occurring in FIG. 5;

FIG. 8 is a view useful for explaining the circuit of FIG. 5;

FIG. 9 is a view showing the characteristics of the circuit shown in FIG. 5;

Figure 1:
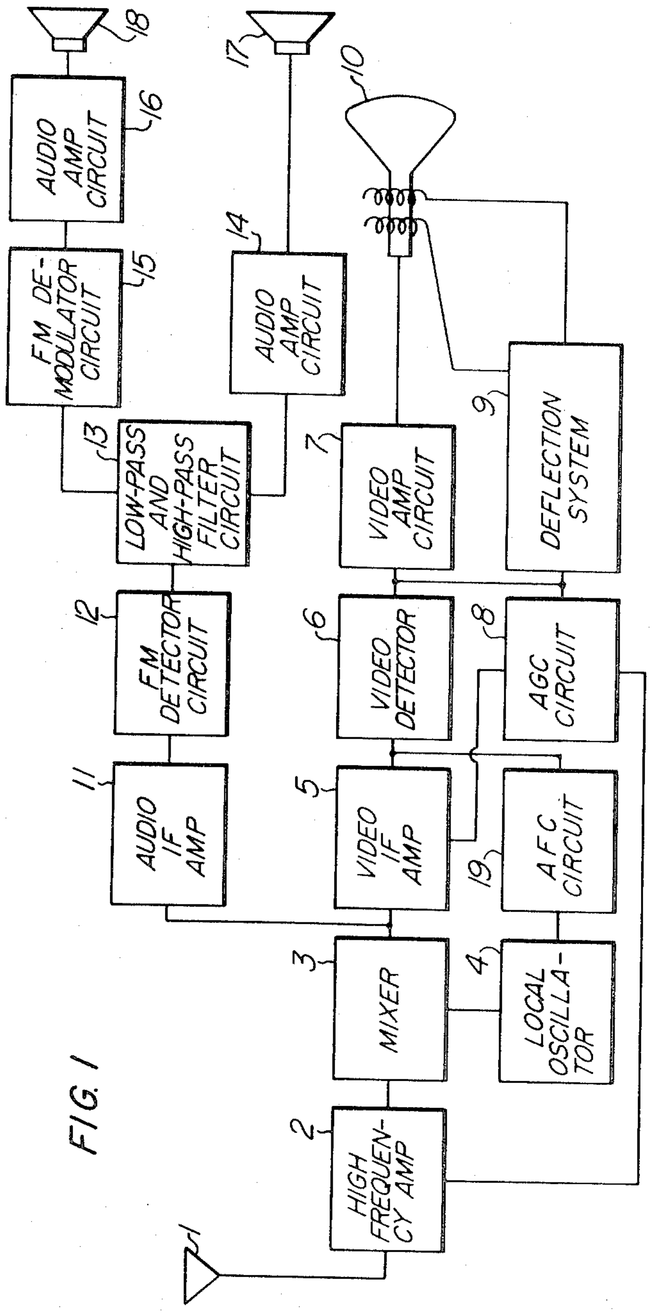
FIG. 1 is a block diagram showing a sound multiplex broadcast television receiver.
Figure 3:
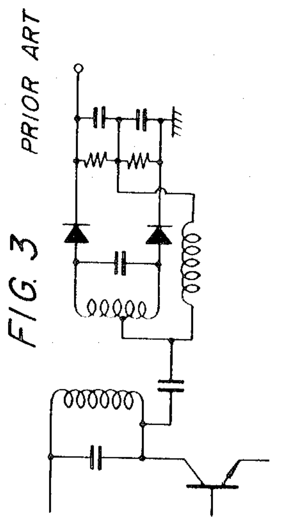
FIG. 3 is a circuit diagram showing the conventional Foster-Seeley phase discriminator.
Figure 2:
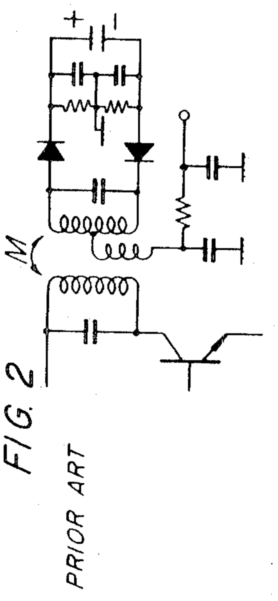
FIG. 2 is a circuit diagram showing the conventional ratio detector.

Referring to FIG. 1 of the drawings, there is shown in a block diagram one type of sound multiplex broadcast television receiver, wherein 1 represents an antenna, 2 a high frequency amplifier, 3 a mixer, 4 a local oscillator, 5 a video intermediate frequency amplifier, 6 a video detector, 7 a video amplifier circuit, 8 an AGC circuit, 9 a deflection system, and 10 a picture tube. These elements are similar to those of conventional television receivers. Numeral 11 denotes an audio intermediate frequency amplifier, 12 an FM detector circuit, 13 a low-pass and high-pass filter circuit, 14 and 16 audio amplifier circuits respectively, 15 an FM demodulator circuit, 17 and 18 speakers respectively, and 19 an automatic frequency control circuit (referred to as an AFC circuit hereinafter) for controlling the local oscillator. The audio intermediate frequency is 54.25 MHz. for the Japanese system and 41.25 MHz. for the U.S. system, and the bandwidth of this signal required by the FM detector circuit 12 is about ±300 kc. Further, the center frequency of the AFC circuit 19 is 58.75 MHz. for the Japanese system and 45.75 MHz for the U.S. system. It is considered that the frequency detection band should be ±300 kc. to ±400 kc. for improved control characteristics of the AFC circuit. FIGS. 2 and 3 show examples of the conventional ratio detector and Foster-Seeley phase discriminator respectively. If these circuits are constructed for the aforementioned frequency band, then frequencies $f_1$ and $f_2$ in the characteristics shown in FIG. 4 become ±600 kc. or higher with respect to the center frequency. This is because in the aforementioned frequency band it is impossible to make sufficiently high the no-load Q of the coils used in FIGS. 2 and 3. With such arrangements, the detection band ($f_1$ to $f_2$) becomes unnecessarily high, and therefore it is impossible to realize improved characteristics.

Referring to FIG. 5, there is shown an embodiment of the present invention as embodied in the Foster-Seeley phase discriminator circuit. The principle of such circuit is the same as that of the ratio detector, and therefore description will be made of the cases where the present invention is embodied in the Foster-Seeley phase discriminator circuit. In this Figure, FIG., numeral 21 indicates a final stage signal amplifier transistor, 22 a coil, 23 a capacitor, and 24 a terminal connected with a power source and which is grounded high-frequency wise. The coil 22 and capacitor 23 are tuned to the center frequency $f_o$ of the signal. Another coil 25 and capacitor 26 are also tuned to the frequency $f_0$. The coils 22 and 25 are inductively coupled to each other. Numeral 27 represents a capacitor which is connected with one end of the coil 22 and an intermediate point of the coil 25, 28*a* and 28*b* denote diodes used in the conventional Foster-Seeley phase discriminator circuit respectively, 29 and 30 detector diodes provided according to the present invention respectively, 31 and 32 load resistors for detection respectively, 33 a rectifying capacitor, and 34 an output terminal. A signal in the primary tuning circuit of the double-tuning circuit constituted by the coil 22 and capacitor 23 is supplied as a primary voltage $e_1$ to the intermediate point of the coil 25 forming the secondary tuning circuit of the double-tuning circuit through the capacitor. A voltage $e_2$ occurs at the secondary side of the double-tuning circuit. The relationships in amplitude and phase between $e_1$ and $e_2$ are as shown in FIG. 6. Applied to the detection diodes 28*a* and 28*b* are voltages E+ and E− where E+ corresponds to the vectorial sum of $e_1$ and $e_2/2$, while E− corresponds to the vectorial sum of $e_1$ and $-e_2/2$. $e_1$and $e_2/2,-e_2/2$ respectively. The vectorial relationships among E+, E−, $e_1$, $e_2/2,e_2/2$ are as shown in FIG. 7. The relationship between the amplitudes of the voltages E+ and E− and the frequency are also shown in FIG. 4. If the diodes 29 and 30 are removed from FIG. 5, then the circuit shown therein is substantially the same as that of FIG. 3. Examination will now be made of high-frequency voltages (referred to as reference voltages hereinafter) which are imparted to the diodes 29 and 30 respectively. It will be seen that the cathode sides of these diodes are grounded high-frequency wise and that the primary voltage $e_1$ is commonly applied to the anode sides of the diodes. For the sake of simplicity, only the circuit portion including the diodes 28*a* and 29 is shown in FIG. 8, wherein higher one of the voltages E+ and $e_1$ appears at a point 35 after having been detected and rectified, and that one of the diodes to which the lower one of the voltages is applied is reversely biased so that it is prevented from performing any detecting operation. This is also true of the circuit including the diodes 28*b* and 30 in FIG. 5. The relationship in amplitude and phase between the voltages applied to the respective diodes are as shown in FIG. 7. If E+ and E− are greater than the radius $e_1$ of a dotted circle about a point 0 in FIG. 7, then the diodes 28*a* and 28*b* are enabled to perform detecting operation. If E+ becomes lower than $e_1$, then the diode 29 is made to serve as a detector diode. Whereas if E− becomes lower than $e_1$, then the diode 30 serves as a detector diode. This is shown in terms of frequency in FIG. 9. More specifically, in the case of the circuit shown in FIG. 5, voltages such as indicated by curves *j*, *f*, *d*, *c*, *b*, and *i* in FIG. 9 appear across the detection load resistor 31 after having been detected and rectified, and voltages indicated by curves *h*, *a*, *c*, *e*, *g* and *k* appear across the other resistor 32 after having been detected and rectified. Thus, these voltages are differentially imparted to the circuit of FIG. 5, and consequently a voltage indicated by a solid line of which the detection band is between $f_1'$ and $f_2'$ appears at the output terminal 34. (In this case, it is assumed that the detection efficiency of the diodes is 1.) Points *d* and *e* correspond to the frequencies at which the dotted circles cross the solid circle respectively. From this Figure, it will be seen that the detection band has been decreased from $f_1$–$f_2$ down to $f_1'$–$f_2'$, and that the detection sensitivity in the neighborhood of $f_0$ remains the same. Even if the load resistors 31 and 32 are eliminated, no change will occur in the operation. In this case, the diodes which are not performing detecting operation are reversely biased, and thus their backward resistances serve as load resistors.

Figure 10:
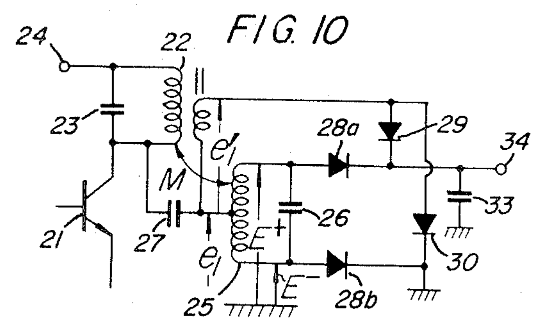
FIG. 10 is a circuit diagram showing a second embodiment of the present invention.
Figure 11:
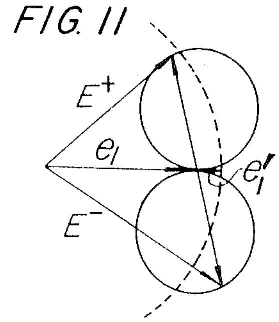
FIG. 11 is a vector view showing the vector sum signal occurring in FIG. 10.
Figures 12, 13, 14, 15, 16:
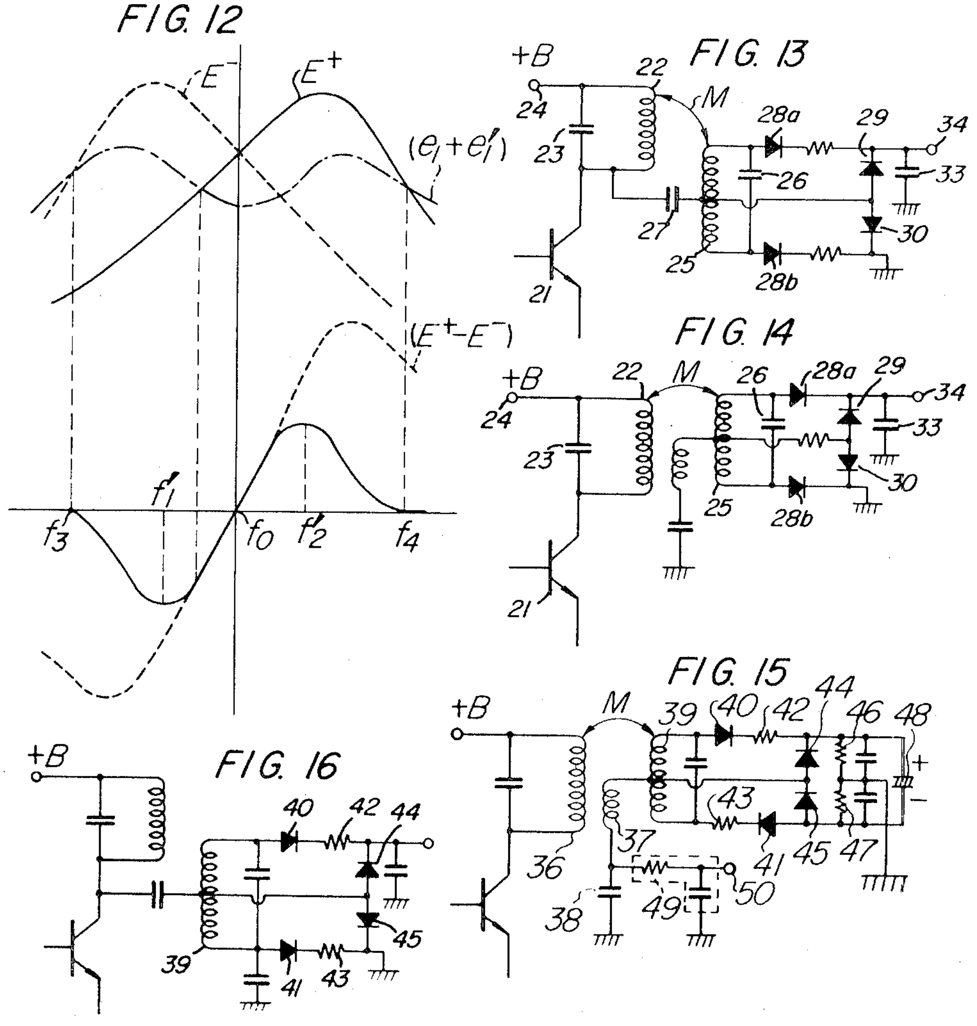
FIG. 12 is a view showing the characteristics of the circuit shown in FIG. 10.
FIGS. 13, 14, 15, and 16 are views showing third, fourth, fifth, and sixth embodiments of the present invention respectively.

FIG. 10 shows the circuit according to a second embodiment of the present invention, wherein a signal (referred to as reference voltage hereinafter) supplied to the diodes 29 and 30 of FIG. 5 is higher than $e_1$ by a voltage $e_1'$ which appears across the coil wound in closely coupled relationship with the primary side. The vectorial relationship is shown in FIG. 11. In this case, which diodes are made to serve as detector diodes is determined by the comparison of the amplitudes of E+ and E– with that of $e_1+e_1'$. The relationship of the amplitudes of the respective voltages with respect to frequency is shown in FIG. 12. As will be seen also from this Figure, in this circuit, the output is completely zero for frequencies lower than $f_3$ or higher than $f_4$. In other words, output occurs for frequencies between $f_3$ and $f_4$. The frequency range $f_1'$–$f_2'$ in FIG. 10 is narrower than that in FIG. 5. By reversing the polarity of $e_1'$ in FIG. 10, it is possible to make the design so that the frequency band $f_1'$–$f_2'$ is located intermediate between that of FIG. 5 and that of FIG. 3.

FIGS. 13 and 14 show the circuits according to third and fourth embodiments of the present invention, each of which is characterized in that a resistor or resistors are connected in series with each detection diode respectively. The resistor or resistors decrease the detection efficiency of the diodes with which the said resistor or resistors are connected. Thus, the circuit of FIG. 13 produces the same effect as that of the circuit shown in FIG. 10, and the circuit shown in FIG. 14 is adapted to represent the same characteristics as those of the circuit shown in FIG. 10 when the polarity of the voltage $e_1'$ is reversed. In the case of the circuit shown in FIG. 13, the detection sensitivity in the neighborhood of $f_0$ is decreased as compared with the case of the circuit shown in FIG. 10 for the same input, but the circuit of FIG. 13 can be conveniently put to practical use.

Although in the foregoing, the present invention has been illustrated and described as applied to Foster-Seeley phase discriminator circuits, it is possible to make similar explanation when the present invention is applied to a ratio detector or discriminator. This is because although these circuits are different from each other in respect of their detection principles, the determination of detection diodes by comparison of amplitudes is made in exactly the same way. FIG. 15 shows the present invention as embodied in a ratio detector circuit. This circuit corresponds to that of FIG. 13, and therefore the characteristics thereof are similar to those shown in FIG. 12. In FIG. 15, numeral 36 represents a primary tuning circuit, and 37 a coil wound in closely coupled relationship to the coil of the primary tuning circuit and which provides the reference voltage $e_1$. Numeral 38 indicates a high-frequency grounding capacitor, 40 and 41 detection diodes for E+ and E– described above respectively, 44 and 45 detection diodes for narrowing the detection band respectively, 42 and 43 resistors for producing the effect equivalent to increase in the amplitude of the reference voltage $e_1$ by making the detection efficiency of the diodes 40 and 41 lower than that of the diodes 44 and 45 respectively, 46 and 47 detection load and smoothing capacitor, and 48 a stabilizing capacitor. The AM depressing effect of the stabilizing capacitor is never lost by embodying the present invention. Numeral 49 indicates the output terminal of a deemphasis circuit.

In the foregoing, the present invention has been described as applied to the Foster-Seeley type, but it is to be understood that the present invention can equally be applied to the ratio type. Furthermore, in the foregoing description has been made of the case where inductive coupling is effected in all double tuning circuits. However, similar description is possible with respect to capacitive coupling. FIG. 16 shows an example of such a case.

What is claimed is:

1. A frequency discriminator circuit, including means comparing two signals appearing between one end of each of two tuned circuits and ground with a signal appearing between the center of one of said tuned circuits and ground to selectively detect the signal having a greater amplitude, comprising:
- tuned circuit means having a primary tuned circuit and a secondary tuned circuit, said primary and secondary tuned circuits being inductively coupled;
- first connecting means connected between one end of said primary tuned circuit and the center of said secondary tuned circuit for applying a signal produced in said primary tuned circuit to the center of said secondary;
- first and second diodes serially connected from one end of said secondary tuned circuit, said first and second diodes being connected in opposite directions to each other;
- third and fourth diodes serially connected from the other end of said secondary tuned circuit, said third and fourth diodes being connected in opposite directions to each other; and
- second connecting means connected between said center of said secondary tuned circuit and the junction point between said second and fourth diodes.

2. A frequency discriminator circuit according to claim 1, wherein said second connecting means comprises a third tuned circuit.

3. A frequency discriminator circuit according to claim 1, wherein a resistor is connected in series with any of said first, second, third and fourth diodes to vary the detection efficiency thereof.

* * * * *

UNITED STATES PATENT OFFICE
CERTIFICATE OF CORRECTION

Patent No. 3,621,409 Dated November 16, 1971

Inventor(s) Kazutoshi SEGAWA

It is certified that error appears in the above-identified patent and that said Letters Patent are hereby corrected as shown below:

The Claim for Convention Priority is missing from this Patent and should read as follows:

--Japan, Patent Appln. N° 80160/68 filed Oct. 28, 1968 and
Japan, Patent Appln. N° 75560/69 filed Sept. 20, 1969. --.

Signed and sealed this 27th day of June 1972.

(SEAL)
Attest:

EDWARD M.FLETCHER,JR.
Attesting Officer

ROBERT GOTTSCHALK
Commissioner of Patents